United States Patent [19]

Prazak et al.

[11] 4,078,239

[45] Mar. 7, 1978

[54] METHOD AND APPARATUS FOR SCREENING SLOT-MASK, STRIPE SCREEN COLOR CATHODE RAY TUBES

[75] Inventors: Charles J. Prazak, Elmhurst; Yong S. Park, Roselle, both of Ill.

[73] Assignee: Zenith Radio Corporation, Glenview, Ill.

[21] Appl. No.: 701,773

[22] Filed: Jul. 2, 1976

[51] Int. Cl.[2] .......... G03B 41/00

[52] U.S. Cl. .......... 354/1; 96/36.1

[58] Field of Search .......... 354/1; 96/36.1

[56] References Cited

U.S. PATENT DOCUMENTS

| | | | |
|---|---|---|---|
| 3,587,417 | 6/1971 | Bolder et al. | 354/1 |
| 3,628,429 | 12/1971 | Barten et al. | 354/1 |
| 3,783,754 | 1/1974 | Takemoto et al. | 354/1 X |
| 3,936,151 | 2/1976 | Yomazoki et al. | 354/1 X |
| 3,989,524 | 11/1976 | Polac | 354/1 X |

*Primary Examiner*—Edna M. O'Connor
*Attorney, Agent, or Firm*—John H. Coult

[57] ABSTRACT

This disclosure depicts method and apparatus for screening slot-mask, stripe screen type color cathode ray tubes particularly method and apparatus for improving screen stripe uniformity and edge definition. The method involves supporting a curved, approximately rectangular faceplate which has on its concave inner surface a photosensitive coating and which has supported adjacent its inner surface an exposure mask defining an array of columns of spaced slots oriented parallel to the minor axis of the faceplate. A line source of radiation actinic to said coating is supported on or near a central axis of the faceplate. The disclosed method includes producing a virtual image of the line source which appears, when viewed from off-axis points on the faceplate, to be rotated in a direction effective to decrease an unwanted rotational displacement of the mask slot images induced by the relative geometry of the line source, the mask slots and the faceplate inner surface. Stripe width uniformity and edge definition is thus improved. Preferred apparatus for implementing the disclosed method includes a negative meniscus lens.

8 Claims, 21 Drawing Figures

FIG. 3
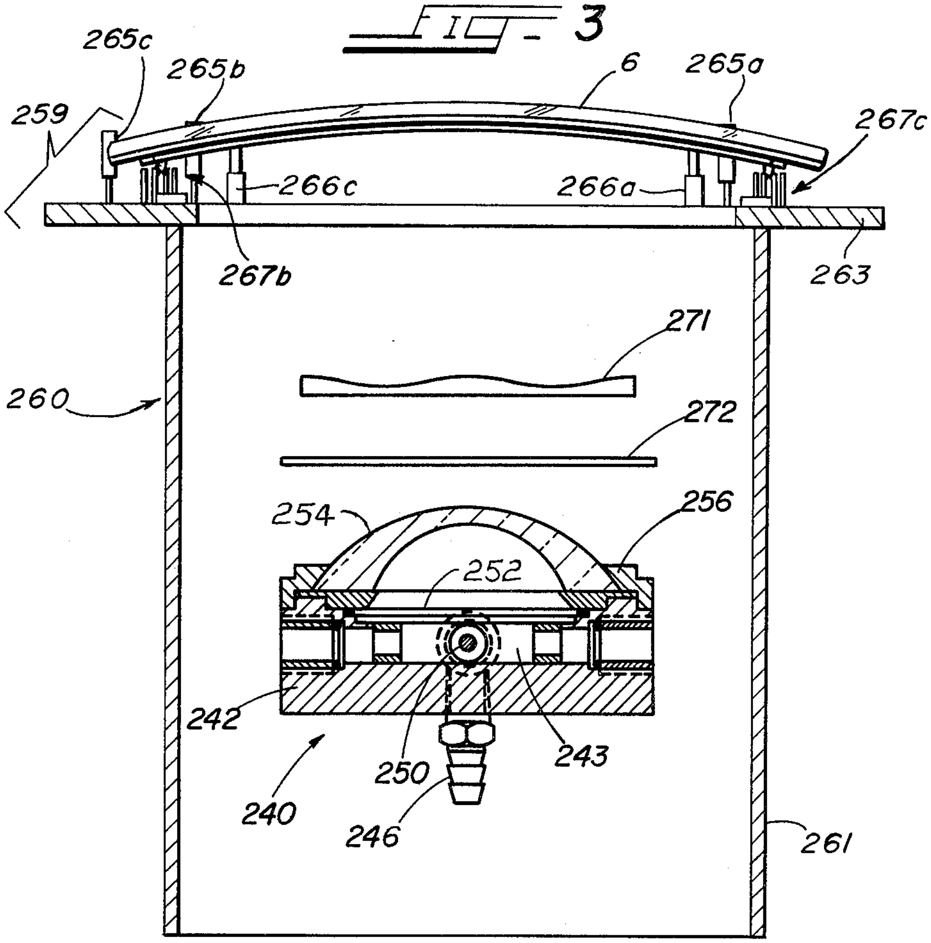
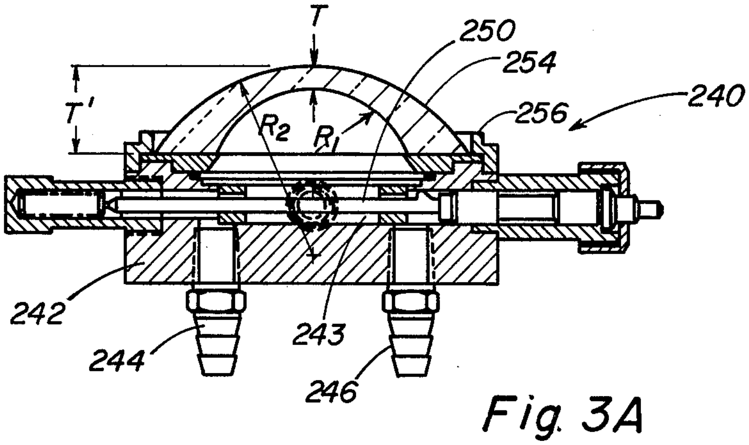
Fig. 3A

FIG. 5
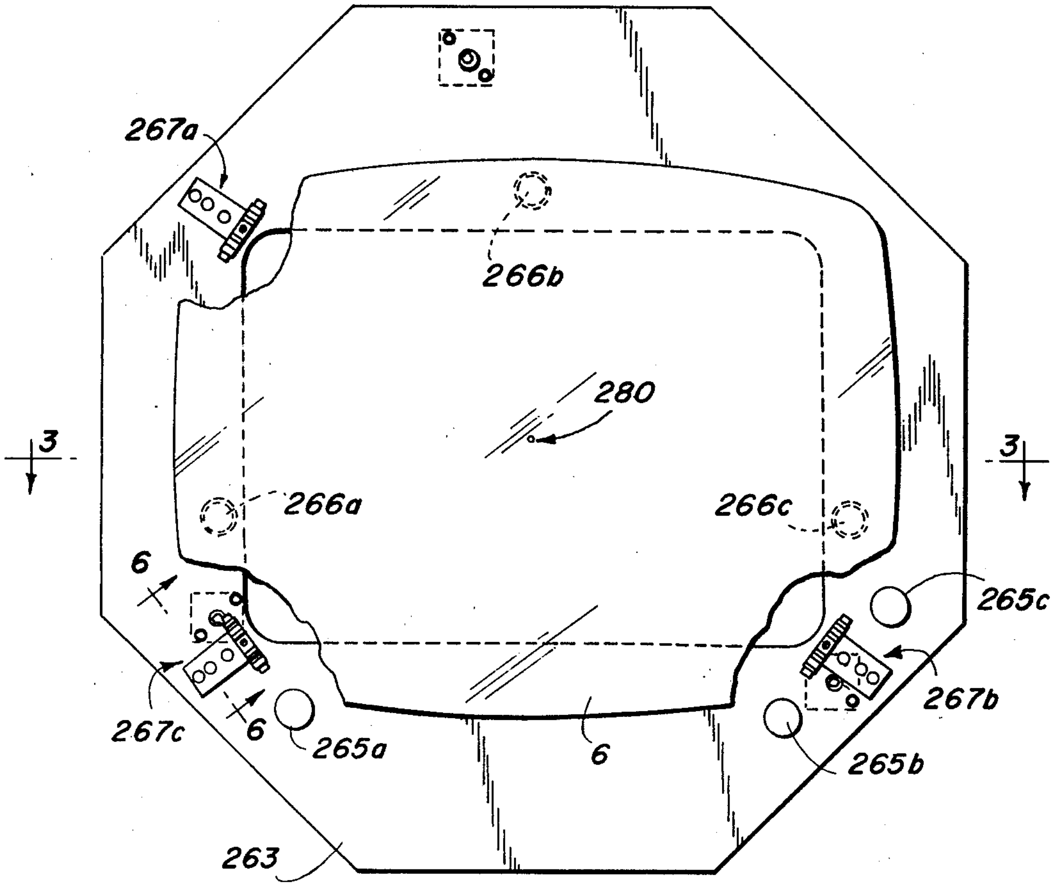
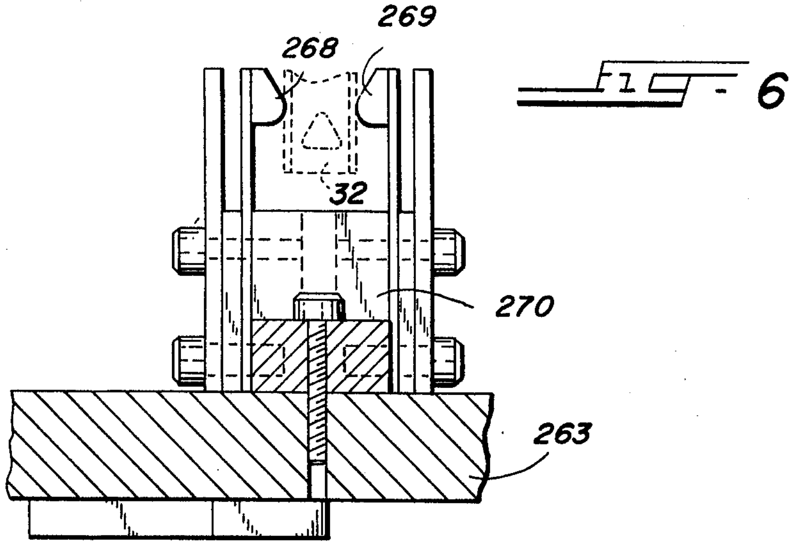
FIG. 6

METHOD AND APPARATUS FOR SCREENING SLOT-MASK, STRIPE SCREEN COLOR CATHODE RAY TUBES

CROSS-REFERENCE TO RELATED APPLICATION

This application is related to, but not dependent upon, copending applications including Ser. No. 285,985, filed Sept. 5, 1972 which has been abandoned in favor of a second generation continuation application Ser. No. 675,653, filed Apr. 12, 1976; Ser. No. 384,874, filed Aug. 2, 1973; No. 462,915, filed Apr. 22, 1974 (now U.S. Pat. No. 3,971,490); Ser. No. 527,001, filed Nov. 25, 1974 (now U.S. Pat. No. 4,028,580 Ser. No. 603,984, filed Aug. 12, 1975 (now U.S. Pat. No. 3,986,072; Ser. No. 646,802, filed Jan. 5, 1976 now U.S. Pat. No 3,995,283, all assigned to the assignee of this invention.

BACKGROUND OF THE INVENTION

This invention relates to the photoscreening of slot-mask, stripe-screen type color cathode ray tubes and in particular concerns method and apparatus for improving the width uniformity and edge definition of the stripes of phosphor material and, in certain tubes, the stripes of black material interposed between the stripes of phosphor material.

Conventional color cathode ray tubes of the slot-mask, stripe-screen type include a curved, approximately rectangular faceplate which has a concave inner surface and which supports in spaced relationship thereto a shadow mask having a correspondingly curved central portion in which is formed an array of spaced columns of slots oriented parallel to the minor axis of the faceplate.

Certain commercial tubes of the slot-mask, stripe-screen type have so-called "positive tolerance" between the beam landing areas and the phosphor stripes — that is, a condition in which the beam landing areas (defined by the mask slots) are narrower in the horizontal (scanning) direction than the phosphor stripes by an amount sufficient to provide a tolerance against misregister between the beam landing areas and the phosphor stripes. A second class of tubes of the slot-mask, stripe-screen type have a "negative tolerance" condition in which the beam landing areas are wider in the horizontal direction than the phosphor stripes by a predetermined amount sufficient to provide a misregister tolerance.

In the tubes of the negative tolerance type it is a universal practice to interfill the spaces between the narrow phosphor stripes with a black material in order to improve the contrast of the tube and make possible a marked improvement in brightness. It is more difficult to form the stripes in tubes of the negative tolerance type than in tubes of the positive tolerance type, since the phosphor stripes must be formed narrower than the slots in the mask (the mask is conventionally used as a photographic stencil during the photoscreening process).

Either of two methods is commonly employed to produce screen stripes which are narrower than the mask slots. In one process, the so-called "etchback" or "post-etch" process, a shadow mask having slots smaller than their ultimate size is used during the photoscreening process to form the desired narrow phosphor stripes. Subsequently, the mask slots are enlarged to a size appropriate to form beam landing areas larger than the phosphor stripes.

it is now more common practice to form the narrowed phosphor stripes by a strictly photographic process wherein a light source is used which has such dimensions as to form light penumbras, which penumbras can be effectively utilized to create exposure patterns which are narrower than the mask slots.

It is common practice to use the same penumbra photoscreening techniques to form continuous, full-height phosphor and matrix stripes (stripes which are unbroken from top to bottom of the screen, including behind the "tie-bars" between the mask slots. Continuous phosphor stripes are desirable to avoid any problem of vertical misregister of electron beam landing area and phosphor element. It is not an uncommon practice in the industry, however, to form phosphor stripes which are discontinuous, with the areas behind each tie-bar being covered with black material rather than phosphor. The teachings of the present invention may be applied to tubes having either continuous or broken phosphor stripes. As used herein, the term "stripe" is intended to be generic to both species of stripes.

It is standard practice in the photoscreening of slot-mask, stripe-screen tubes to employ a line source of UV (ultraviolet) radiation, the axis of which source is aligned parallel to the minor axis (commonly termed the "Y" axis) of the faceplate to be screened. It has been found, however, that due to the nonparallelism of the line source with the slots in the mask in all regions of the faceplate except the center and along the major and minor axes, there results an unwanted rotational displacement of the individual slot images projected on the faceplate inner surface. This results in a nonaligned overlapping of the projected slot images, with a consequent uniformity in the width of the stripes and a poor definition of the stripe edges. This problem is especially severe in the corners of the faceplate. Ragged, nonuniform screen stripes produce undesirable degradation of color purity and a poor screen appearance.

A number of prior art approaches have been developed to overcome the afore-described stripe formation problems. The most commonly employed approach to solving these problems, expounded by German Pat. No. 2,408,993 and U.S. Pat. Nos. 3,888,673 and 3,890,151, involves moving the light source, the light dispersion correction lens(es), and/or an auxiliary scanning mask, during the photoexposure operation. The prior art approaches utilizing a moving light source, lens, and/or scanning mask are apt to suffer, however, from undesirable complexity, inflexibility, and unreliability. More importantly, approaches which utilize a scanning mask to block parts of the screen while other parts are being exposed, are extremely wasteful of exposure light, necessitating very long exposure times and resulting in increased screening costs.

As will be explained in great detail hereinafter, by this invention, in its apparatus context, there is provided screening exposure lighthouse apparatus for assisting in the photoscreening of slot-mask, stripe-screen type color CRT's which utilizes a simple negative meniscus lens, or one equivalent in effect, to rectify to a major extent the afore-described stripe width nonuniformity and edge definition problems.

The prior art U.S. Pat. No. 3,587,417 discloses a lighthouse for photoscreening color cathode ray tubes which includes an anamorphic lens to bring into coincidence the apparent position of the light source virtual image for all locations on the faceplate. More particularly, the U.S. Pat. No. 3,587,417 shows a lens which has a negative meniscus characteristic in a plate parallel to the major axis (the "X" axis) of the faceplate but which has no dioptric power parallel to the minor ("Y") axis of the faceplate. The apparatus disclosed in the U.S. pat. No. 3,587,417 patent is designed for use with dot-screen type tubes having shadow masks with circular holes and would have no applicability to the solution of the afore-described stripe degradation problems associated with the photoscreening of slot-mask, stripe-screen tubes using line sources.

A German Pat. No. 1,958,521 suggests a negative meniscus lens for use in redistributing the light intensity from a point source across a faceplate assembly of the type having a dot screen and circular-apertured shadow mask. Experiments with a mensicus lens of the type described in the 1,958,521 patent, used for the purpose intended, were found to be unsuccessful. The 1,958,521 patent is devoid of any disclosure of the use of a lens in the photoscreening of slot-mask, stripe-screen tubes for the purpose of rectifying the afore-described ragged stripe problem.

OTHER PRIOR ART

U.S. Pat. No. 2,936,682
U.S. Pat. No. 3,595,112
U.S. Pat. No. 3,601,018
U.S. Pat. No. 2,817,276
U.S. Pat. No. 3,211,067
U.S. Pat. No. 3,420,150

OBJECTS OF THE INVENTION

It is an object of the present invention to provide method and apparatus for use in the photoscreening of color cathode ray tubes of the slot-mask, stripe-screen type.

It is another object to provide method and apparatus effective in rectifying to a major extent the stripe nonuniformity and edge definition degradation inevitably associated with the photoscreening of slot-mask, stripe-screen tubes using a line source.

It is another object to provide improved exposure light-house apparatus which has no moving parts, and by comparison with prior art approaches, is relatively very simple, low in cost and reliable.

It is yet another object to provide such improved exposure lighthouse apparatus for slot mask, stripe screen tubes, the slot image rotation rectifying effects of which may be very easily adjusted and controlled, and the operation of which does not require significantly increased exposure times or light source brightness.

BRIEF DESCRIPTION OF THE DRAWINGS

The features of the present invention which are believed to be novel, are set forth with particularity in the appended claims. The invention, together with further objects and advantages thereof, may best be understood by reference to the following description taken in conjunction with the accompanying drawings, in the several figures of which like-reference numerals identify like-elements, and in which:

FIG. 3 is a sectional side-elevational view, shown schematically, of an exposure lighthouse embodying the teachings of the present invention;

FIG. 3A is an isolated sectional side elevational view of a light source and a slot image rotation correction lens shown in FIG. 3;

FIG. 5 is a plan view of the lighthouse shown in FIGS. 3 and 4, with a faceplate to be screened shown in place on the lighthouse and with three corners thereof cut away to show otherwise hidden components of the lighthouse;

FIG. 6 is an enlarged view of a component of the FIGS. 3–5 lighthouse;

DESCRIPTION OF THE PREFERRED EMBODIMENTS

Figures 1, 2:
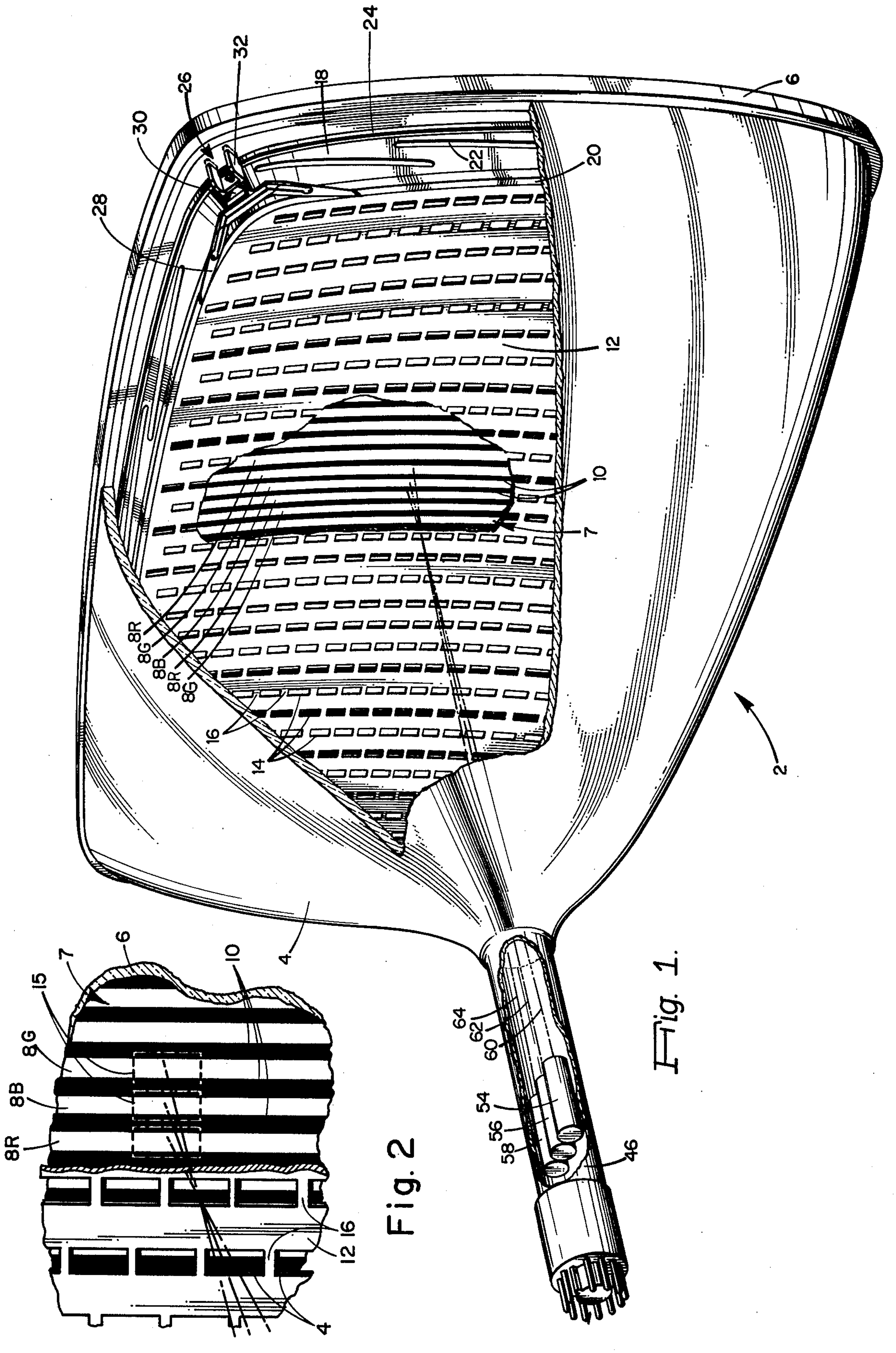
FIG. 1 is a schematic perspective view of a color cathode ray tube made in accordance with the teachings of the present invention; certain parts are shown in exaggerated dimension for clarity of illustration.
FIG. 2 represents an enlargement of a portion of the screen and mask of the FIG. 1 tube.
Figure 4:
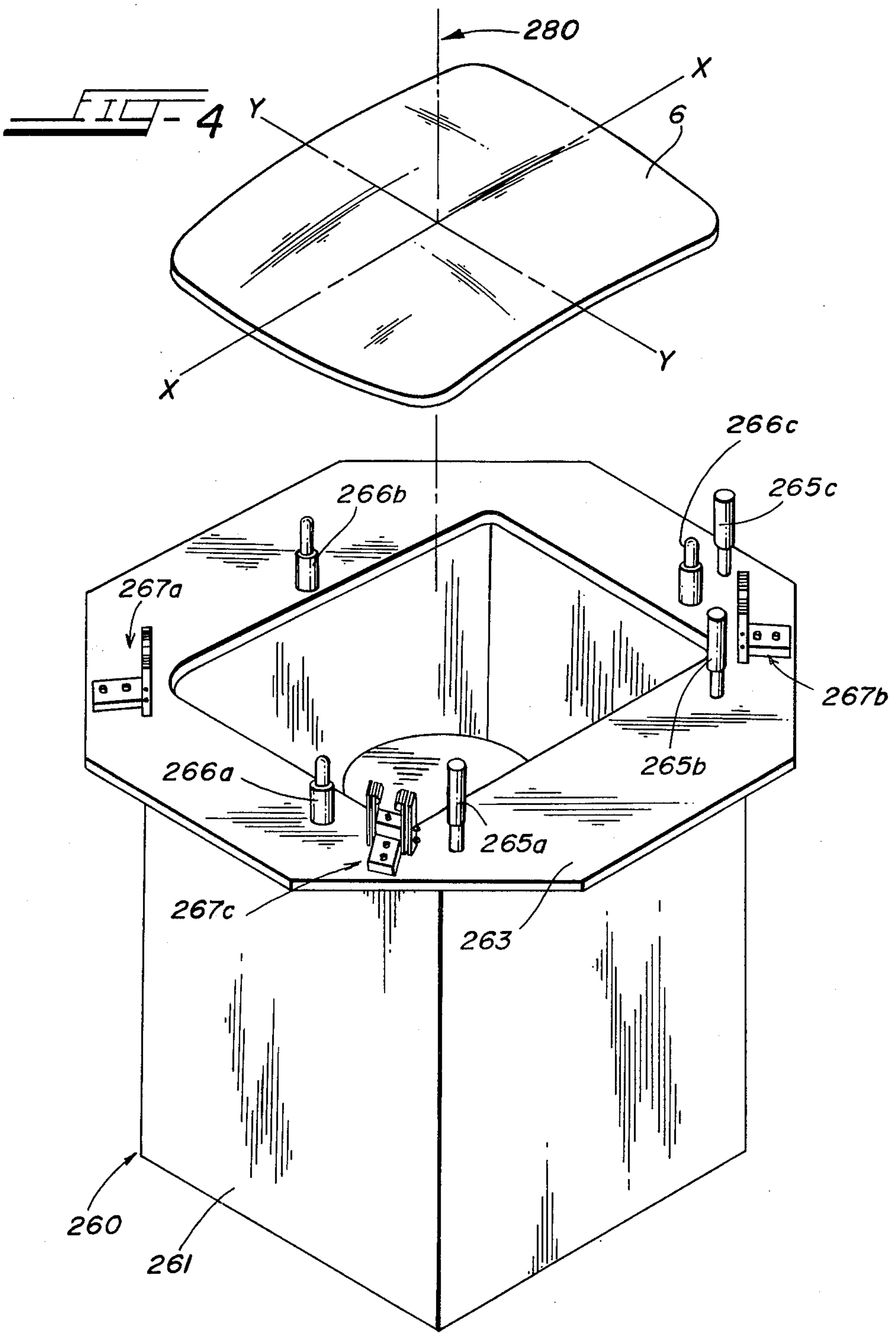
FIG. 4 is a perspective view of the lighthouse shown in FIG. 3, with a faceplate to be screened shown exploded from the lighthouse.

This invention is directed to the provision of an improved method and improved exposure lighthouse apparatus for screening color cathode ray tubes of the slot-mask, stripe-screen type. Before engaging in a description of this invention, a brief description of a tube with which this invention may be used will be given. See FIGS. 1–2.

The illustrated tube 2 is shown as having a unique envelope comprising a funnel 4 sealed to a flangeless faceplate 6. On the concave inner surface of the faceplate 6 is disposed a phosphor screen 7. The screen 7 is shown as comprising an array of vertically oriented, horizontally repeating triads of red-emissive, blue-emissive and green-emissive phosphor stripes 8R, 8B and 8G. The screen is preferably of the negative guardband, black surround-type (See U.S. Pat. No. 3,146,468 --0 Fiore et al), including a pattern of light-absorptive matrix stripes 10 separating the phosphor stripes 8R, 8B, 8G.

A shadow mask 12 has formed therein a spaced periodic array of columns of slots 14 oriented parallel to the minor ("Y") axis of the faceplate 6. Each slot 14 in each column of slots is separated from its neighbor by a "tie bar" 16.

In order to establish the preferred negative guardband condition, the width of the mask slots 14 is such that the electron beam landings 15 on the phosphor stripes 8R, 8B, 8G are wider than the impinged phosphor stripes by an amount equal to an allotted (negative) guardband.

The shadow mask construction is described and claimed specifically in U.S. Pat. No. 3,912,963, having common ownership herewith. Briefly, the shadow mask 12 is shown as having a frameless, one-piece construction formed from a single sheet of electrically conductive material such as steel. An integral skirt 18 provides rigidity for the mask and shields the screen 7 from stray and overscanned electrons. Integrally formed ribs 22, channel 20 and edge lip 24 cause the mask 12 to be relatively stiff with respect to the major and minor axes thereof, while permitting the mask to flex with respect to its diagonals and thereby conform, when mounted, to the contour of the faceplate.

A suspension system of unique construction is provided for supporting the shadow mask 12 in spaced adjacency to the inner surface of the faceplate 6. The suspension system shown is described and claimed in the referent copending applications and other patents of common ownership herewith, including U.S. Pat. Nos. 3,912,963; 3,894,260; 3,890,526; 3,904,914 and 3,943,399.

Briefly, the illustrated suspension system comprises a set of the suspension devices 26, each comprising a bracket 28 mounted on a corner of the mask 12. The bracket 28 carries a leaf spring 30. The spring 30 is relatively resilient, but tangentially stiff (in its own plane). The spring 30 has a provision on its distal end which engages a mating provision on a faceplate-mounted stud 32 when the mask 12 is mounted in its operative position on the faceplate 6.

As shown in FIG. 1, the tube 2 has a neck 46 within which is contained an electron gun assembly. The electron gun assembly is shown as being of the "in-line" type, wherein three separate guns 54, 56, 58 generate three coplanar beams 60, 62, 64 intended to carry, respectively, red-associated, blue-associated and green-associated color video information.

A brief explanation will now be given of the screening operations by which a negative tolerance, black matrix phosphor screen is deposited on the inner surface of the cathode ray tube faceplate 6 using the shadow mask 12 as a photographic stencil. First the pattern of black stripes 10 is deposited. The black stripe deposition process, insofar as its chemistry and photochemistry is concerned, may, for example, be as described in U.S. Pat. No. 3,632,339 — Kahn, assigned to the assignee of the present invention.

Briefly, the process described in the Kahn patent includes the steps of depositing on the faceplate 6 a coating of a photosensitive material such as dichromated PVA (polyvinyl alcohol) and then exposing the coating to a light pattern through the mask 12. After exposure of the PVA coating, the coating is developed to yield a pattern of PVA stripes whose distribution, size and shape correspond to the distribution, size and shape of the phosphor stripes desired to be formed between the black stripes 10.

After development of the PVA coating, the faceplate is covered with a layer of a light-absorptive material such as graphite. The graphite layer is then dried and a chemical stripping agent such as hydrogen peroxide is used to strip the pattern of PVA elements from the faceplate, and with it the overlying light-absorptive material. The result is a pattern of black stripes 10, the spacings between which have a distribution, size and shape corresponding to those which the phosphor stripes are desired to have.

After the black stripes 10 are photochemically deposited upon the faceplate 6, patterns of red-emissive phosphor stripes 8R, green-emissive phosphor stripes 8G and blue-emissive phosphor stripes 8B are deposited in succession in the spaces formed between the black stripes 10. The chemical processes for screening the patterns of red-emissive, blue-emissive and green-emissive phosphor stripes onto the faceplate may be according to standard practice in the art. Briefly, each of these three phosphor screening operations may involve depositing on the pattern of black stripes a photosensitive phosphor layer containing, typically, dichromated PVA and a phosphor material. The layer is dried and exposed to ultraviolet radiation in a novel lighthouse (described below) through the shadow mask 12.

After exposure of the photosensitive phosphor-containing layer, the mask 12 is removed and the photosensitive layer developed to produce a pattern of phosphor stripes filling one-third of the spaces in the pattern of black stripes 10. After successive deposition of the remaining two patterns of phosphor stripes, all of the spaces between the black stripes 10 are filled. The faceplate 6 at this point in its processing contains on its inner surface a pattern of black stripes 10 having in the spaces therebetween three interlaced patterns of red-emissive, blue-emissive and green-emissive phosphor stripes. By appropriate selection of the light source length, and the source intensity and time of exposure, the stripes 8R, 8B, 8G may be formed as continuous stripes which extend from the top to the bottom of the screen without interruption.

The screening of a faceplate of the construction shown in FIG. 1, is preferably accomplished in a lighthouse 260 constructed according to this invention, as shown, for example, in FIGS. 3–6. The lighthouse is illustrated schematically as comprising a base 261 within which is contained a light source 240 of UV (ultraviolet) radiation. The source is a line source oriented in the direction in which the phosphor stripes are to be formed on the faceplate 6, i.e., parallel to the minor axis "Y" of the faceplate. In the illustrated embodiment, the light source 240 is shown as being of the water-cooled type comprising a housing 242 defining a cooling chamber 243. Inlet and outlet cooling water nipples 244, 246 pass cooling water to and from the chamber 243.

Located within the chamber 243 is a high pressure mercury arc lamp 250 which generates a fine bare arc which emits UV radiation. The electrical inputs to the lamp 250 and the water feed and return conduits are not shown in order to simplify the illustration. At the top of the chamber 243 is located a transparent window 252 through which UV radiation from the lamp 250 passes to the faceplate to be exposed.

In accordance with the present invention there is provided a slot-image rotation correction lens 254, a description of the construction and function of which will be deferred until completion of this overall description of the exposure lighthouse apparatus. The lens 254 is captured on the light source housing 242 by a ring 256.

The lighthouse 260 includes on the base 261 a table assembly 259. The table assembly 259 comprises a table top 263 having a set of three prealignment posts **265*a*, 265*b*, 265*c* for prealigning a faceplate 6 to be screened, and a set of three support posts 266*a*, 266*b*, 266*c* for supporting the weight of the faceplate 6. The prealignment posts 265***a*, 265*b*, 265*c* may have a construction similar to that of conventional faceplate alignment posts. The support posts 266*a*, 266*b*, 266*c* may also be of conventional construction.

To precisely align the faceplate 6 during the photoexposure operations, there is provided a set of three alignment chucks 267*a*, 267*b*, 267*c* in three corners of the table 263 for receiving three of the studs 32 (see FIG. 4) extending from the corners of the faceplate 6. Each of the chucks is shown as comprising a pair of spring jaws 268, 269 supported by a base structure 270 (see FIG. 6). The alignment chucks 267*a*, 267*b*, 267*c* are anchored to the table top 263 with a high degree of positional accuracy, and, by the symmetrical pinching, stud-centering effect thereof, they accomplish a precise positioning of the faceplate 6 relative to the light source 240.

The lighthouse 260 also is shown as including a correction lens 271 and neutral density filter 272, both of which may be of conventional construction. As is well known, the correction lens serves to adjust the directionality of the exposure light ray at various points on the faceplate to properly locate and shape the screen stripes. The filter 272 appropriately shades the intensity distribution of the UV radiation cast on the faceplate.

Before describing in detail the present invention, a more thorough explanation of the problem to which this invention is directed and its origin, will be discussed. As an aid to explanation, the screen stripe nonuniformity and edge definition problem resulting from the use of a line source and a curved shadow mask and faceplate will hereinafter, at times, be termed the "ragged stripe" effect. As noted above, the ragged stripe effect results directly from the geometry involved in using a line source with three dimensionally curved (spherical or multi-radial, e.g.) mask and screen. Before going further, it is noted that in a negative tolerance tube, the ragged stripe problem is more severe when it occurs in the matrix stripes since they are deposited first and their edges define the edges of the over-deposited phosphor stripes.

A screen stripe, of either phosphor or black matrix composition, is formed during its photoexposure operation as a superposition of end-overlapped individual mask slot images. Instead of being parallel the screen's Y (minor) axis, an image of a single off-axis slot (that is, a slot located off either the X or Y axes) appears to be rotated on the screen surface about a line normal to the screen through the image center. The direction of slot image rotation is such that the slot image "leans" toward the nearest end of the minor axis.

Computer simulation of the screen image makes possible the following conclusions (assuming the light source is centered about the Z (faceplate) axis (280 in FIG. 4) and oriented parallel to the Y axis).

1. For a light source of fixed length, the amount of rotation of a screen slot image produced from a single mask slot decreases for slot positions approaching the X or Y axis.
2. For a fixed mask position, the screen image produced by a single off-axis slot is rotated to a degree proportional to the source length. Increasing the source length appears to increase
   (a) the individual slot image angle of rotation,
   (b) the individual slot image length, and
   (c) the nearest-neighbor image overlap.
3. Small changes in the width of the source or mask slot do not affect the degree of screen image rotation.
4. The maximum screen image rotation angle for a 13V, 110° tube is about 6.5° using a 0.030 × 0.875 inch light source.
5. The ragged stripe problem cannot be resolved by adjustment of the source length. The source length is best optimized to cancel tie bar shadows and provide uniform illumination.
6. An individual slot image is not symmetric along its own longitudinal axis.

Figure 7A:
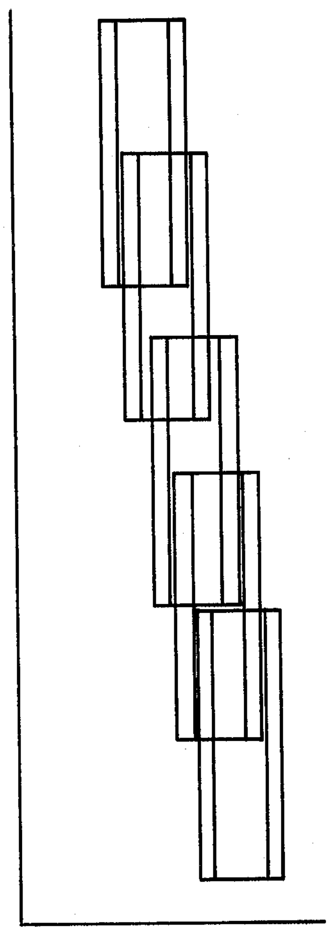
FIG. 7A is a computer plot showing the predicted slot image rotation effect which occurs in off-axis regions of a faceplate being screened; the effect is due to the nonparallelism of source and mask slot in those regions.
Figure 7B:
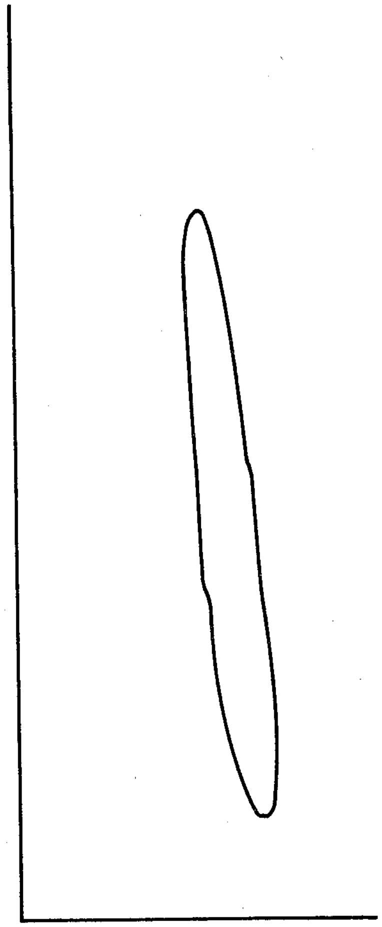
FIG. 7B is a tracing of an actual photograph of a projected slot image; the photograph reveals the predicted slot image rotation.

FIG. 7A is a computer-simulated screen slot image produced from a corner mask centered at $X = 5.5$ inches, $Y = 3.5$ inches. The projected slot image represents a composite of a large number of overlapping rectangles produced by illumination from a single point on the line source. FIG. 7B is a tracing of a photograph of a projected slot image as actually produced. The source used in both FIGS. 7A and 7B had dimensions of 0.030 inch by 0.875 inch. The projected slot images were located in the upper right hand quadrant of the screen.

Figure 8:
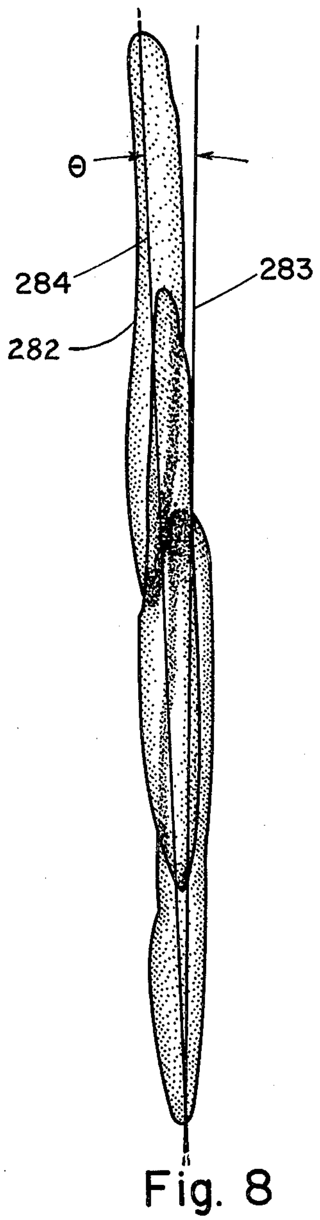
FIG. 8 is a tracing of a photograph of a screen stripe formed without the use of the present invention; note that it is composed of a series of overlapped, individually rotated slot images.

The effect produced in the screening of a faceplate through an actual slot mask is shown in FIG. 8. FIG. 8 is a tracing of a screen photograph showing a portion of an exposed and developed screen stripe situated in the upper left quadrant of the screen. Note the effects of the rotational displacement of the individual slot images and their overlap upon neighboring images. An individual slot image is labeled 282; its axis is labeled 283. The stripe axis is labeled 284. The angle between axis 283 and 284 (the angle of rotation of an individual slot image) is labeled "$\theta$" in FIG. 8. It can be seen that the result of slot image rotation is to produce a ragged screen stripe having a nonuniform width and poor edge definition. The computer-predicted displacement angle "$\theta$" of the individual slot images for the screen shown in FIG. 8 was approximately 6° which agreed very closely with the test results.

Figure 9A:
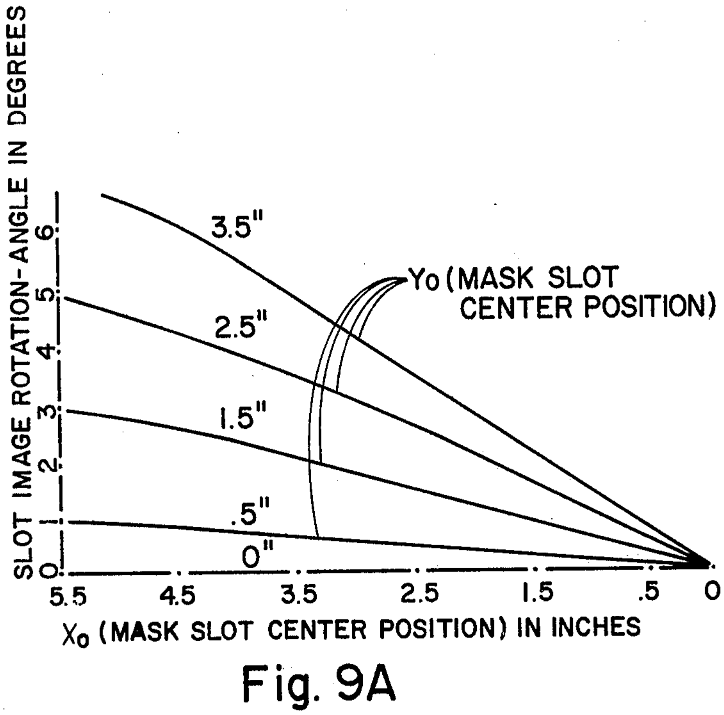
FIGS. 9A and 9B are graphical representations of slot image rotation angle as a function of mask slot position.
Figure 9B:
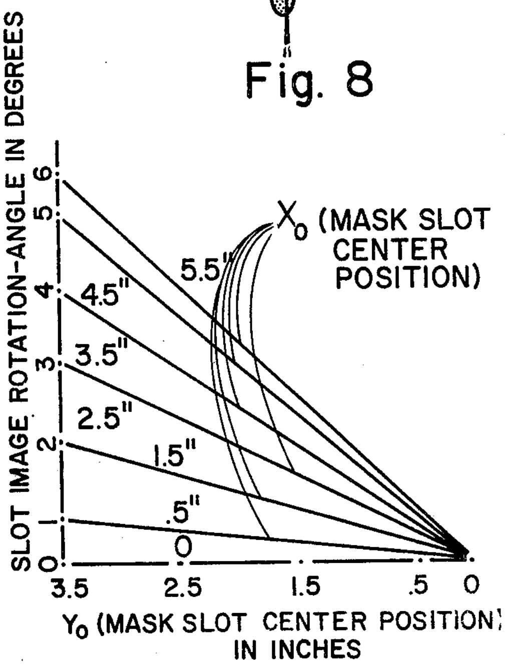

FIGS. 9A and 9B are graphical representations depicting the rotation angle of the slot images as a function of slot position. FIGS. 9A and 9B illustrate that as the X or Y axis is approached from an off-axis position, the angle of rotation of a projected slot image decreases nearly linearly. The rotational displacement disappears at the Y axis because the slot and source longitudinal axes lie in the same vertical plane. The rotational displacement disappears on the X axis because the slot and source longitudinal axes are nearly parallel and the spherical surface gradient $dz/dy$ of each slot along the X is the same. The source dimensions were 0.030 by 0.875 inch.

The present invention will now be described. In accordance with the teachings of this invention, the rotational displacement of the individual slot images, and thus the aforedescribed ragged stripe problem, is to a major extent rectified by following a method which includes producing a virtual image of the line source which appears, when viewed from off-axis points on the faceplate, to be rotated in a direction effective to decrease said unwanted rotational displacement of the mask slot images. The method is believed to be best implemented by the provision in the exposure lighthouse of the special image rotation correction lens 254.

In accordance with an aspect of this invention, the lens 254 is positioned on the optical axis between arc produced by the arc lamp 250 and the center of the faceplate and at a predetermined distance away from the source (the arc). The lens has the property that at the said source-to-lens distance, it produces a rotated virtual image of the source. It has been found that the apparent rotation of the source introduced by the lens is effective to counter to a major extent the unwanted rotational displacement of mask slot images and thus to improve stripe width uniformity and edge definition.

Although a number of lenses and lens systems may be selected to meet to achieve the desired results, a negative meniscus lens, as shown at 254, is preferred. A negative meniscus lens at an appropriate source-to-lens distance produces a demagnified, rotated, virtual image of the source. Since a negative meniscus lens has been found to achieve slot image rotation correction very successfully, it is believed that the demagnification property may be desirable.

The lens 254 is positioned on the axis 280 of the faceplate, or on the appropriate left or right parallax axis (depending upon which screen stripe pattern is being screened). The lens 254 is oriented with the concave side of the lens facing the source. The spacing of the lens from the source, the inner and outer lens radius ($R_1$, $R_2$), the lens material, and T and T' (lens thickness parameters) may be adjusted to vary the degree of correction produced by the lens, as will become evident hereinafter.

Figure 10:
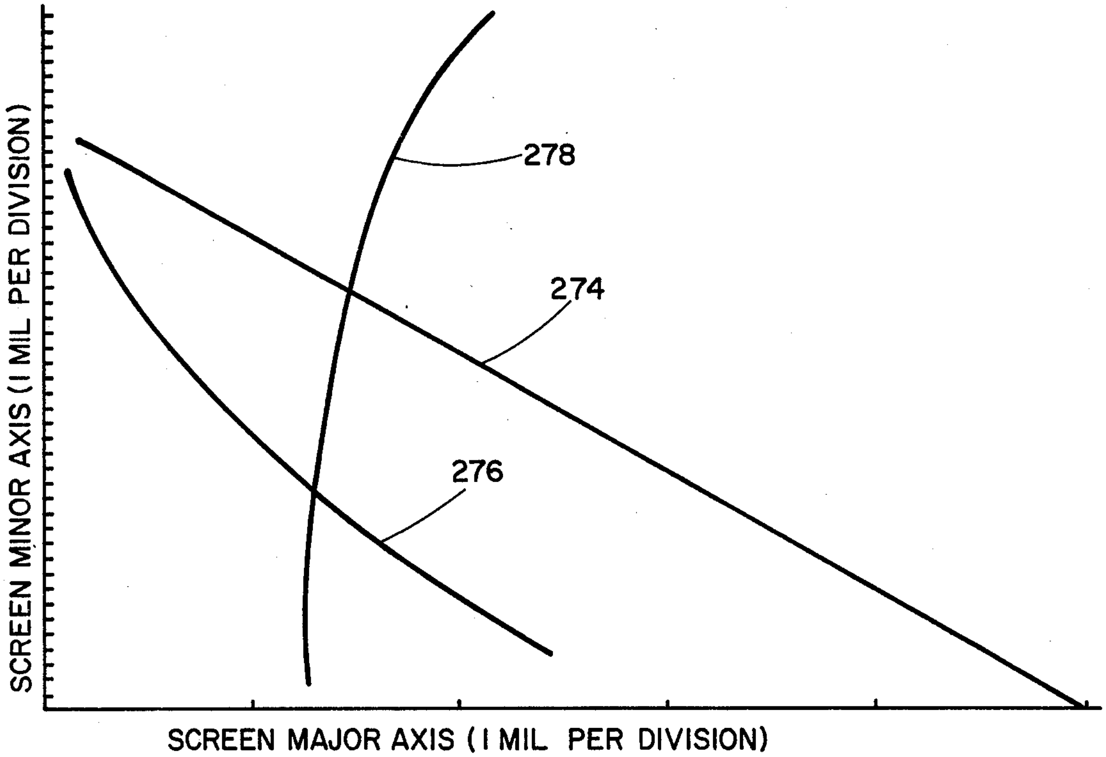
FIG. 10 depicts curves showing the rotational displacement of projected slot images which occur on the faceplate being screened, both with and without the rectifying effect produced by the present invention.

The effects of the use of a negative meniscus, or other suitable lens, in accordance with this invention and the reason why it is highly effective to improve the width uniformity and edge definition of screen stripes will be better understood by referring to FIG. 10. Consider the nature of an image of a line source parallel to the Y axis of the faceplate 6, as it might be imaged through a pinhole in the mask. Any distortion of the image of the line source would be due largely to geometrical effects. FIG. 10 portrays three hypothetical ray trace images 274, 276, 278 of a line source as formed through a pinhole at a screen position $X = 7.5$ inches, $Y = 5.0$ inches (upper right quadrant). The image labeled 274 shows the results of the rotational displacement due to the afore-described geometrical effects. (Note that the different scales selected for the X and Y axes exaggerates the amount of rotation). Image 276 is an image of the line source that would result upon interposition of a negative meniscus lens 254 in accordance with this invention. Note that the effect of the use of the negative meniscus lens 254 is to rotate the line source image counter-clockwise, and to introduce a slight curvature therein. Since the rotation of the line source image is in the direction of the Y axis, the result is a significant rectification of the afore-described ragged stripe problem.

It is noted that another effect of using a negative meniscus lens 273 is to laterally outwardly shift the location of the image 276 — in this instance to the right. The image 276 is shown in FIG. 10 as being superimposed on image 274, however, in order that the images may be conveniently compared.

FIG. 10 reflects the existence of a one-to-one correspondence between points on a source image. Because the images 274, 276 (with and without the meniscus lens 254) represent a one-to-one mapping, it is possible to subtract the inherent image rotational displacement from the combined effect of the said rotational displacement with the rectifying effect of the meniscus lens 254. Such a remainder image attributable to the isolated effects of the lens 254 alone is shown by 278 in FIG. 10. (Image 278 has also been linearly displaced from its true position with respect to image 274 so that it too may be displayed conveniently with image 274.)

Successful tests have been conducted on 13V and 19V tubes using a negative meniscus lens having the specifications set forth in the table below:

| PARAMETER | 19V | 13V |
|---|---|---|
| Meniscus Lens 254 | | |
| R1 | .75" | .75" |
| R2 | 1.38" | 1.38" |
| T | .125" | .125" |
| T' | .875" | .875" |
| Screen Radius | 31.191" | 21.750" |
| Mask Major Radius | 30.750" | 21.875" |
| Mask Minor Radius | 33.900" | 23.750" |
| Mask Diagonal Radius | 31.250 41 | 22.125" |
| Mask Diagonal Angle | 35.55° | 33.55° |
| Source-to-Screen Distance | 9.963" | 6.350" |
| Source-to-Lens Distance | .555" | .555" |
| Mask-to-Screen Distance | .462" | .405" |
| Lens Refractive Index | 1.48 | 1.48 |
| Slot Length | .027" | .018" |
| Slot Width | .008" | .008" |
| Tie Bar (Corner) Width | .0065" | .0055" |
| Source Length | 1.00" | .625" |
| Source Width | .060" | .060" |

Theoretical calculations show that for the specified 13V tube at a position $X = 3$ inches, $Y = 4.5$ inches, the rotational displacement of a projected slot image would be about 4.2°. Using the negative meniscus lens according to this invention, however, it should be about 2.1°. For the 19V tube specified, at a mask slot position of $X = 5$ inches, $Y = 7.5$ inches, the image rotational displacement is predicted to be about 4.5°; with the use of a negative meniscus lens the rotational displacement should be about 2.4°. Tests have shown that the degree of rectification of the image rotation is at least as great as that predicted theoretically. In some cases it has been found to be greater than theoretical calculations predict.

Figure 11A:
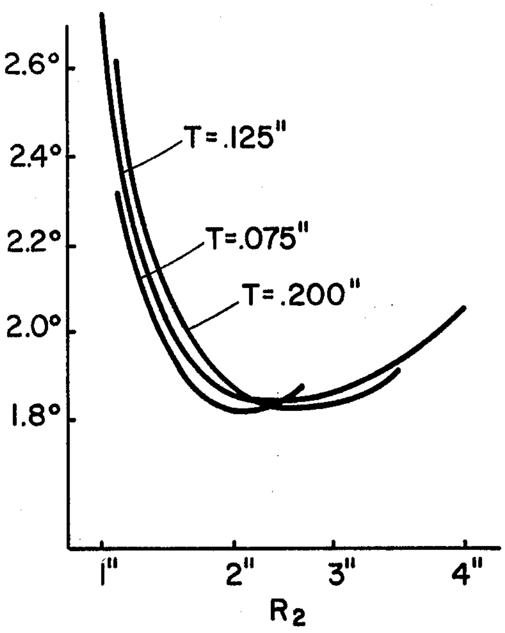
FIGS. 11A–11D and 12A–12D are curves showing the effect of varying various parameters of a novel image rotation correction lens provided according to the present invention.
Figure 11B:
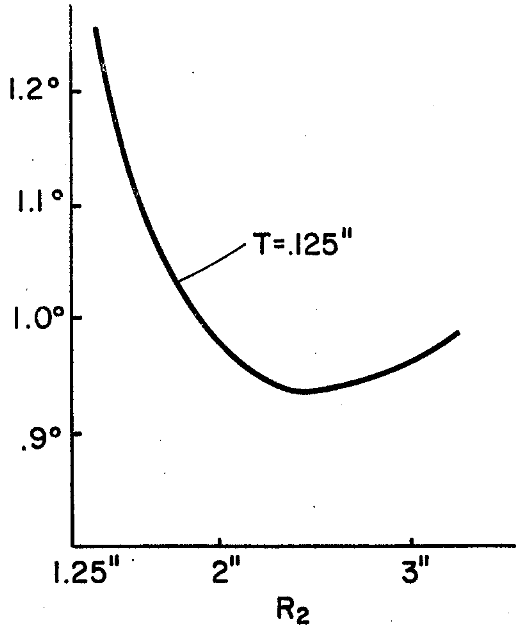
Figure 11C:
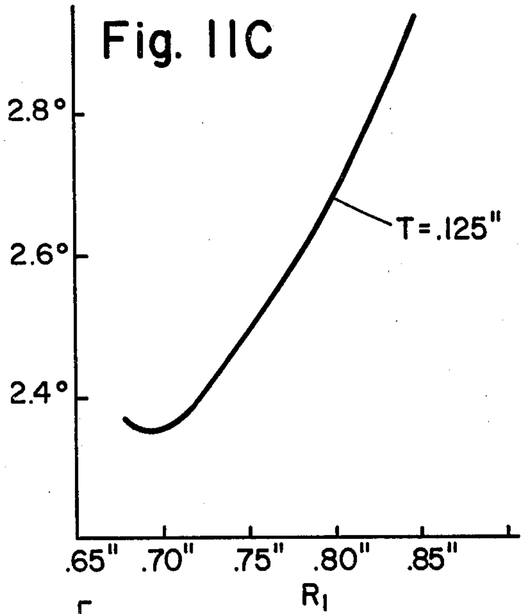
Figure 11D:
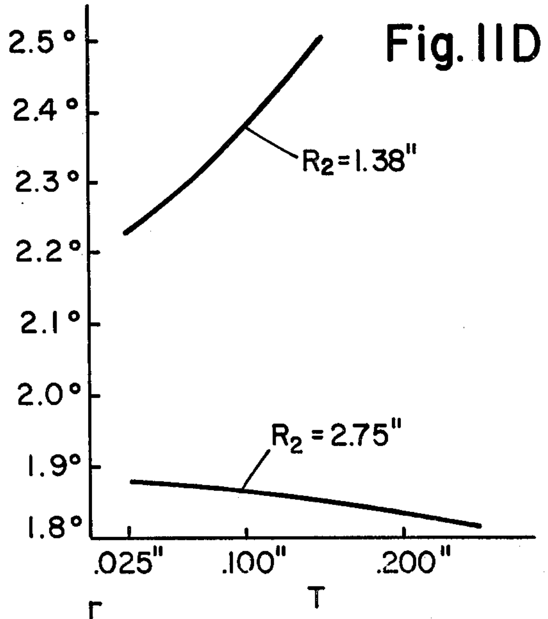
Figure 12A:
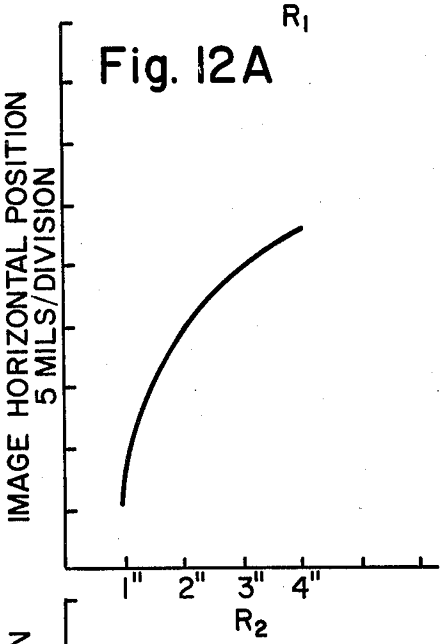
Figure 12B:
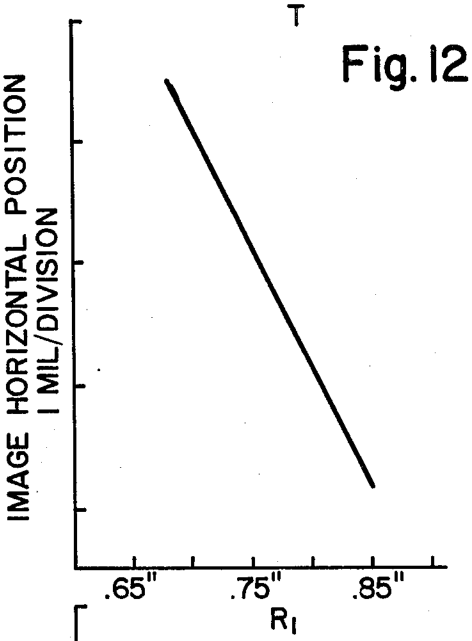
Figure 12C:
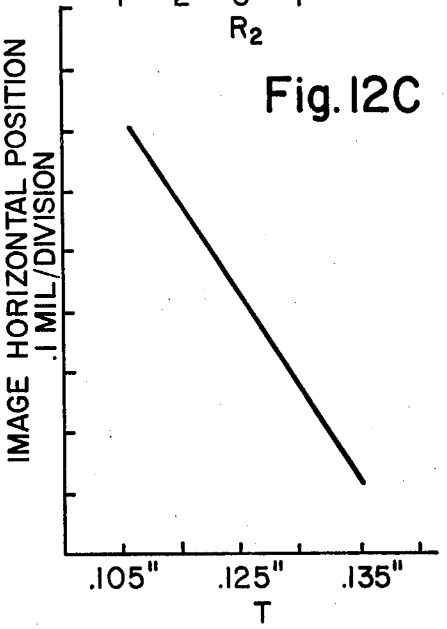
Figure 12D:
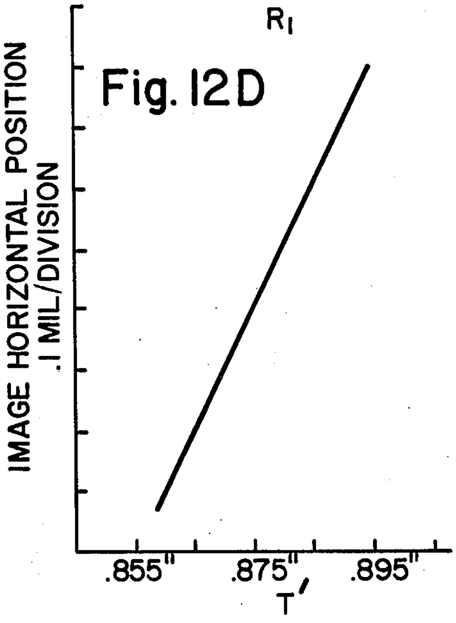

FIGS. 11A–11D are curves depicting the net angle of rotation of a projected slot image as a function of various parameters of the negative meniscus lens 254 provided according to this invention. The slot position for FIGS. 11A, 11C and 11D are: $X = 7.5$ inch, $Y = 5.0$ inch. The slot position for FIG. 11B is: $X = 7.5$ inch, $Y = 2.5$ inch. A 19V tube is considered. In all curves the vertical axis represents the angle of rotation of the projected slot image. In the FIGS. 11A–11D curves and in FIG. 3, "R1" is the inside radius of the meniscus lens, "R2" is the outside radius of the lens, "T" is the thickness of the lens at its thinnest point, and "T'" is the overall thickness of the lens along the Z axis. In FIGS. 11A–11D, where lens parameter values are not given, they are as tabulated above for the 19V tube.

From FIGS. 11A–11D the following conclusions may be drawn. First, that the reduction in the rotational displacement of projected slot images can be further reduced for a 19V tube by as much as 25% by increasing R2 from the test value of 1.38 inches to approximately 2.50 inches. Similar studies show that for a 13V tube, reductions by as much as about 40% can be achieved by the same expedient. Secondly, it is impractical to reduce the angle of image rotation by decreasing R1 or T further.

FIGS. 12A–12D are graphs showing the variations in the horizontal (parallel to the X axis) position of projected slot images as a function of various lens parameters. The tube is a 13V tube; the slot position on the mask is $X = 5$, $Y = 3.0$ inches. Other parameters whose values are not given are as shown in the above table for the 13V tube.

Whereas the present invention has been illustrated in the context of screening a unique tube having a flangeless faceplate, the principles of this invention are applicable to the photo-screening of any color cathode ray tube of the slot-mask, stripe-screen variety. As is evident from FIGS. 11A–11D and 12A–12D, various parameters of the lens 271 may be varied consistent with meeting the objectives of the invention. Lenses of other types and constructions may be used. The invention is not limited to the particular details of construction of the methods and embodiments depicted and other modifications and applications are contemplated. Certain changes may be made in the above-described method and apparatus without departing from the true spirit and scope of the invention herein involved.

What is claimed is:

1. For use in fabricating the screen of a color cathode ray tube of the slot mask, stripe-screen type, a method for exposing with a line source a photosensitive coating on the concave inner surface of the faceplate of such a tube, which method is effective to form screen stripe images having improved width uniformity and edge definition, said method comprising:

supporting a curved, approximately rectangular faceplate which has on its concave inner surface a photosensitive coating and which has supported adjacent its inner surface an exposure mask defining an array of columns of spaced slots oriented parallel to the minor axis of the faceplate;

providing a line source of radiation actinic to said coating and supporting said source on or near a central axis of the faceplate, at a predetermined distance from the concave inner surface of said faceplate, and with the line of the source oriented parallel to the minor axis of the faceplate, said line source being thus substantially parallel to mask slots at the center of the mask but nonparallel to slots in other parts of the mask, the said source-slot nonparallelism and faceplate curvature representing a condition effective to produce an unwanted rotational displacement of individual mask slot images projected on the faceplate inner surface in regions of the inner surface lying off the major and minor axes of the faceplate, which unwanted rotational displacement of projected slot images would in turn result in stripe width nonuniformity and degraded stripe edge definition in the said regions of the faceplate; and exposing said coating to said source while producing a virtual image of the line source which appears, when viewed from off-axis points on the faceplate, to be rotated in a direction effective to decrease said unwanted rotational displacement of the mask slot images and thus improve stripe width uniformity and edge definition.

2. The method defined by claim 1 wherein said virtual image of the source is demagnified.

3. For use in fabricating the screen of a color cathode ray tube of the slot mask, stripe-screen type, a method for exposing with a line source a photosensitive coating on the concave inner surface of the faceplate of such a tube, which method is effective to form screen stripe images having improved width uniformity and edge definition, said method comprising:

supporting a curved, approximately rectangular faceplate which has on its concave inner surface a photosensitive coating and which has supported adjacent its inner surface an exposure mask defining an array of columns of spaced slots oriented parallel to the minor axis of the faceplate;

providing a line source of radiation actinic to said coating and supporting said source on or near a central axis of the faceplate, at a predetermined distance from the concave inner surface of said faceplate, and with the line of the source oriented parallel to the minor axis of the faceplate, said line source being thus substantially parallel to mask slots at the center of the mask but nonparallel to slots in other parts of the mask, the said source-slot nonparallelism and faceplate curvature representing a condition effective to produce an unwanted rotational displacement of individual mask slot images projected on the faceplate inner surface in regions of the inner surface lying off the major and minor axes of the faceplate, which unwanted rotational displacement of projected slot images would in turn result in stripe width nonuniformity and degraded stripe edge definition in the said regions of the faceplate;

providing a negative meniscus lens having a convex outer surface of radius $R_2$ and a concave inner surface of radius $R_1$ which is smaller than the lens front-to-base thickness and smaller than $R_2$, and positioning said lens between said source and the center of the faceplate with its concave surface facing said source and at a predetermined distance away from said source so as to produce a virtual image of the line source which appears, when viewed from off-axis points on the faceplate, to be rotated in a direction effective to decrease said unwanted rotational displacement of the mask slot images; and exposing said coating to said source thus distorted to produce stripe images on said coating having improved stripe width uniformity and edge definition.

4. For use in exposing a photosensitive coating on the concave inner surface of the faceplate of a color cathode ray tube of the slot mask, stripe-screen type, exposure lighthouse apparatus for forming screen stripes having improved width uniformity and edge definition, comprising:

means for supporting a curved, approximately rectangular faceplate which has on its concave inner surface a photosensitive coating and which has supported adjacent its inner surface an exposure mask defining an array of columns of spaced slots oriented parallel to the minor axis of the faceplate;

a line source of radiation actinic to said coating and means for supporting said source on or near a central axis of the faceplate, at a predetermined distance from the concave inner surface of said faceplate, and with the line of the source oriented parallel to the minor axis of the faceplate, said line source being thus substantially parallel to mask slots at the center of the mask but nonparallel to slots in other parts of the mask, the said source-slot nonparallelism and faceplate curvature representing a condition effective to produce an unwanted rotational displacement of individual mask slot images projected on the faceplate inner surface in regions of the inner surface lying off the major and minor axes of the faceplate, which rotational displacement of projected slot images would in turn result in stripe width nonuniformity and degraded stripe edge definition in the said regions of the faceplate; and a rotation-correction lens positioned on the optical axis between said source and the center of the faceplate at a predetermined distance away from said source, said lens having the property that at the said predetermined source-to-lens distance, it produces a virtual image of the line source which appears, when viewed from off-axis points on the faceplate, to be rotated in a direction effective to decrease said unwanted rotational displacement of the mask slot images.

5. The apparatus defined by claim 4 wherein said rotation-correction lens produces a virtual image of the source which is demagnified.

6. For use in exposing a photosensitive coating on the concave inner surface of the faceplate of a color cathode ray tube of the slot mask, stripe-screen type, exposure lighthouse apparatus for forming screen stripes having improved width uniformity and edge definition, comprising:

means for supporting a curved, approximately rectangular faceplate which has on its concave inner surface a photosensitive coating and which has supported adjacent its inner surface an exposure mask defining an array of columns of spaced slots oriented parallel to the minor axis of the faceplate;

a line source of radiation actinic to said coating and means for supporting said source on or near a central axis of the faceplate, at a predetermined distance from the concave inner surface of said faceplate, and with the line of the source oriented parallel to the minor axis of the faceplate, said line source being thus substantially parallel to mask slots at the center of the mask but nonparallel to slots in other parts of the mask, the said source-slot nonparallelism and faceplate curvature representing a condition effective to produce an unwanted rotational displacement of individual mask slot images projected on the faceplate inner surface in regions of the inner surface lying off the major and minor axes of the faceplate, which unwanted rotational displacement of projected slot images would in turn result in stripe width nonuniformity and degraded stripe edge definition in the said regions of the faceplate; and a negative meniscus lens having a convex outer surface of radius $R_2$ and a concave inner surface of radius $R_1$ which is smaller than the lens front-to-base thickness and smaller than $R_2$, said lens being positioned between said source and the center of the faceplate with its concave surface facing said source and at a predetermined distance away from said source so as to produce a virtual image of the line source which appears, when viewed from off-axis points on the faceplate, to be rotated in a direction effective to decrease said unwanted rotational displacement of the mask slot images and thus to improve stripe width uniformity and edge definition.

7. The apparatus defined by claim 6 wherein said predetermined distance is less than $R_1$.

8. The appratus defined by claim 7 wherein $R_1$ is between about six-tenths and eight-tenths of an inch wherein $R_2$ is between about $1\frac{1}{4}$ and $3\frac{1}{2}$ inches, and wherein said predetermined distance is about $\frac{1}{2}$ inch.

* * * * *